US012640288B2

(12) United States Patent (10) Patent No.: US 12,640,288 B2
Jung et al. (45) Date of Patent: May 26, 2026

(54) GROMMET FOR WIRE

(71) Applicant: HL MANDO CORPORATION,
Gyeonggi-do (KR)

(72) Inventors: Yongkyun Jung, Gyeonggi-do (KR);
Jongsik Song, Gyeonggi-do (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 198 days.

(21) Appl. No.: 18/395,573

(22) Filed: Dec. 24, 2023

(65) Prior Publication Data

US 2024/0428966 A1     Dec. 26, 2024

(30) Foreign Application Priority Data

Jun. 26, 2023     (KR) ........................ 10-2023-0081604

(51) Int. Cl.
*H01B 17/58*       (2006.01)
*B60R 16/02*       (2006.01)
(52) U.S. Cl.
CPC ....... *H01B 17/583* (2013.01); *B60R 16/0222*
(2013.01)
(58) Field of Classification Search
CPC .. H02G 3/22; H02G 3/24; H02G 3/26; H02G
3/28; H02G 3/30; H02G 3/36; B60R
16/02; B60R 16/00; B60R 16/0207; B60R
16/0222; H01B 17/58; H01B 17/30;
H01B 17/303; H01B 17/56; H01B 17/583
USPC .... 174/650, 152 R, 152 G, 153 G, 135, 142,
174/175; 16/2.1, 2.2; 248/56, 68.1, 49;
439/271, 272
See application file for complete search history.

(56) References Cited

U.S. PATENT DOCUMENTS

| 4,180,297 | A | * | 12/1979 | Abrams | ................ | F25D 23/065 |
| | | | | | | 16/2.2 |
| 6,119,305 | A | * | 9/2000 | Loveall | ................ | H05K 9/0018 |
| | | | | | | 174/152 G |
| 6,348,657 | B1 | * | 2/2002 | Haslock | ................ | H02G 3/088 |
| | | | | | | 174/152 G |
| 6,376,777 | B1 | * | 4/2002 | Ito | ........................ | H02G 3/088 |
| | | | | | | 174/152 G |

(Continued)

FOREIGN PATENT DOCUMENTS

| JP | 61-50809 | 4/1986 |
| KR | 1-196840 | 8/1989 |

(Continued)

OTHER PUBLICATIONS

Office Action dated Jan. 14, 2025 for Korean Patent Application No.
10-2023-0081604 and its English translation provided by Applicant's foreign counsel.

*Primary Examiner* — Angel R Estrada
(74) *Attorney, Agent, or Firm* — WOMBLE BOND
DICKINSON (US) LLP

(57) ABSTRACT

A grommet for a wire may include a main body extending
in a first direction parallel to a longitudinal direction of a
wire, a passing hole passing through the main body in the
first direction and accommodating the wire therein, and an
insertion slit formed to be open at a side surface of the main
body to connect the outside of the main body and the passing
hole so that the wire can be inserted into the passing hole in
a second direction orthogonal to the first direction from a
side portion of the main body.

18 Claims, 9 Drawing Sheets

100

(56)                  References Cited

U.S. PATENT DOCUMENTS

| 7,049,515 | B1 * | 5/2006 | Collins | .................. | H02G 3/083 |
| | | | | | 174/58 |
| 7,442,884 | B2 * | 10/2008 | Ball | .................... | H02G 15/113 |
| | | | | | 16/2.2 |

FOREIGN PATENT DOCUMENTS

| KR | 10-1997-0074345 | 12/1997 |
| KR | 10-1446655 | 10/2014 |

* cited by examiner

GROMMET FOR WIRE

CROSS-REFERENCE TO RELATED APPLICATION(S)

This application claims the priority and benefit of Korean Patent Application No. 10-2023-0081604, filed on Jun. 26, 2023 in the Korean Intellectual Property Office, the disclosure of which is incorporated herein by reference in its entirety.

BACKGROUND

1. Field

Some embodiments of the present disclosure generally relate to a grommet for a wire, and more particularly, to a grommet for a wire capable of stably supporting one or a plurality of wires in or on a vehicle body, minimizing a space for fixing the wires, and easily performing wire support work.

2. Description of the Related Art

Various types of electrical components are installed and used in various devices such as vehicles, and these electrical components are electrically connected to each other by wires.

Wires may need to be installed by being fixed to or passing through a body or panel installed in vehicles or the like. Accordingly, a grommet may be installed in the body or panel to stably support one or more wires at a specific point and protect the wires.

In conventional grommets, wires are supported by mounting the wires in the grommet through a passing operation in which the wire is inserted into and passed through a passing hole formed to pass therethrough in a longitudinal direction and installed on a vehicle body or panel. However, for the passing operation, the passing hole of the grommet should be expanded in advance using a tool such as an expander and coated with a lubricant for easy expansion of the passing hole and easy insertion or passage of the wire.

In particular, as various types of electrical components are applied to vehicles today, the use of wires implementing electrical connection in the vehicles are increased. When the passing operation is performed with a plurality of wires in the conventional grommet, the efficiency of the operation may be reduced, and on the contrary, when a single wire is mounted in a single grommet to save time consumed in the passing operation, material costs increase. In addition, a wire fixing space for supporting a plurality of wires is enlarged, thereby reducing the degree of freedom in vehicle design.

Therefore, there is a need for a method capable of improving space utilization of a vehicle body and efficiency of wiring work while stably supporting a plurality of wires on a vehicle body or panel.

SUMMARY

It is an aspect of the present disclosure to provide a grommet for a wire, which can stably fix one or multiple wires on a vehicle body or panel.

It is another aspect of the present disclosure to provide a grommet for a wire, which can promote easy and quick mounting of one or multiple wires.

It is still another aspect of the present disclosure to provide a grommet for a wire, which can improve assembly work efficiency with a simple structure.

It is yet another aspect of the present disclosure to provide a grommet for a wire, which can reduce manufacturing costs and improve the space utilization of a vehicle body.

Additional aspects of the disclosure will be set forth in part in the description which follows and, in part, will be obvious from the description, or may be learned by practice of the disclosure.

In accordance with one aspect of the present disclosure, a grommet for a wire includes a main body extending in a first direction parallel to a longitudinal direction of a wire, a passing hole formed to pass through the main body in the first direction and in which the wire is seated, and an insertion slit formed to be open in a side surface of the main body to connect the outside and the passing hole so that the wire enters the passing hole in a second direction orthogonal to the first direction from a side portion of the main body.

A gap of the insertion slit may be provided smaller than a diameter or thickness of the wire.

The grommet for a wire may further include a support body of which one side is provided with a clamp part which allows at least a part of the main body to be drawn inward and compress the main body and the other side is provided with a fixing part fixed to a supportable structure such as a vehicle body or panel.

The main body may be provided in a cylindrical shape, and an inner circumferential surface of the clamp part may be formed to correspond to an outer circumferential surface shape of the main body.

The main body may be provided in a cylindrical shape, and the clamp part may be formed to be curved so as to be in contact with at least a part of an outer circumferential surface of the main body.

The clamp part may include a mounting hole formed to be open in an end portion thereof to allow the main body to enter inward.

The grommet for a wire may further include support protrusions formed on both ends of the main body to protrude outward in a radial direction to prevent separation of the main body from the clamp part.

At least any one of the main body and the clamp part may be made of an elastically deformable material.

A gap of the mounting hole may be provided smaller than a diameter or thickness of the main body.

An inner cross-sectional area of the clamp part may be provided smaller than a cross-sectional area of the main body.

The passing hole and the insertion slit may be provided as a plurality of passing holes and a plurality of insertion slits in the main body.

A diameter of the passing hole may be provided to correspond to the diameter or thickness of the wire.

In accordance with another aspect of the present disclosure, a grommet for a wire includes a main body having a cylindrical or polygonal cylinder shape extending in a longitudinal direction of a wire, a passing hole formed to pass through the main body in a longitudinal direction so that the wire is inserted into and passes through the main body, and an insertion slit formed to pass through between an outer circumferential surface of the main body and the passing hole in a radial direction and provided with a gap smaller than a diameter of the passing hole.

The grommet for a wire may further include a support body that fixes the main body to a supportable structure such as a vehicle body or panel.

The main body or the support body may be provided to be elastically deformable, and the support body may include a clamp part that compresses at least a portion of the main body to reduce the diameter of the passing hole or the gap of the insertion slit.

The gap of the insertion slit may be provided smaller than a diameter or thickness of the wire.

The passing hole and the insertion slit may be provided as a plurality of passing holes and a plurality of insertion slits in the main body.

The clamp part may include a mounting hole formed in an end portion to allow the main body to enter inward.

The grommet for a wire may further include support protrusions formed on both ends of the main body to protrude outward in the radial direction to prevent the main body from being separated from the clamp part.

A shape of an inner surface of the clamp part may be provided in a cylindrical or polygonal cylinder shape to correspond to a shape of the outer circumferential surface of the main body.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
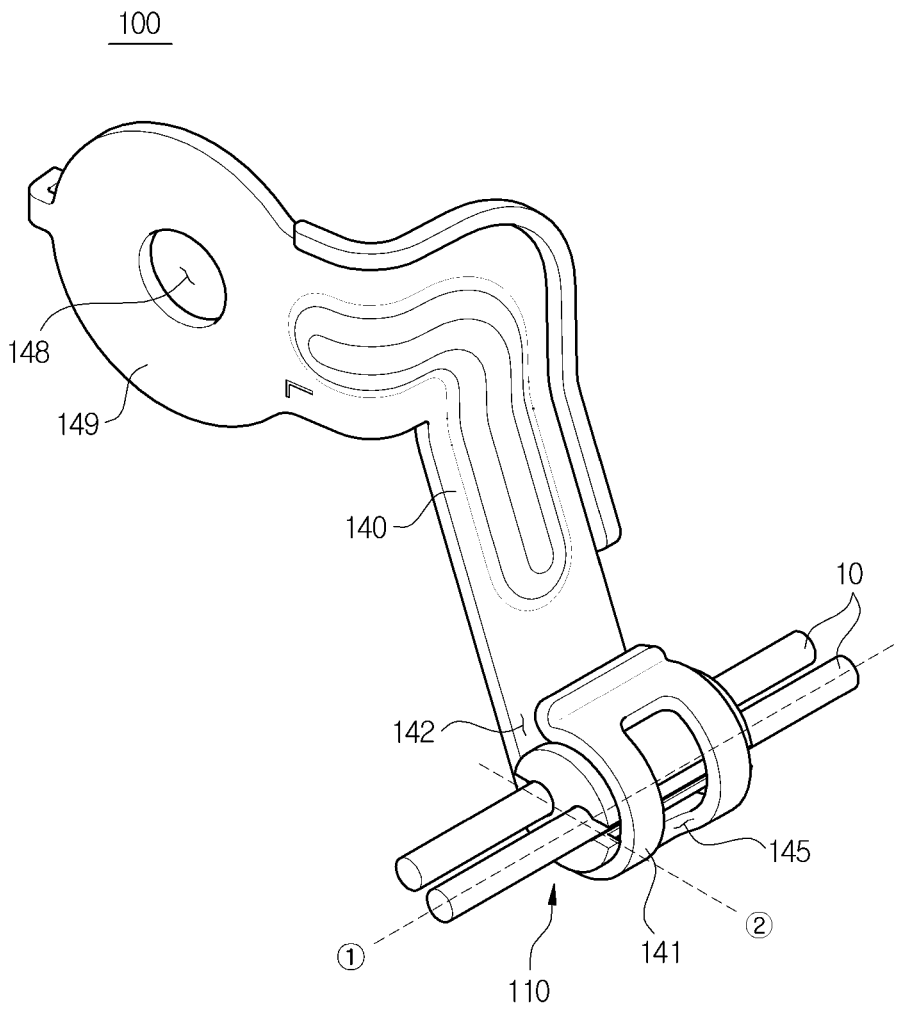
FIG. 1 is a perspective view of a grommet for a wire according to an embodiment of the present disclosure.

Hereinafter, embodiments of the present disclosure will be described in detail with reference to the accompanying drawings. The following examples are presented to suffi- ciently convey the spirit of the present invention to those skilled in the art. The present invention may be embodied in other forms without being limited to only the embodiments presented herein. In the drawings, in order to clarify the present invention, illustration of parts irrelevant to the description may be omitted, and the size of components may be slightly exaggerated to aid understanding.

Figure 2:
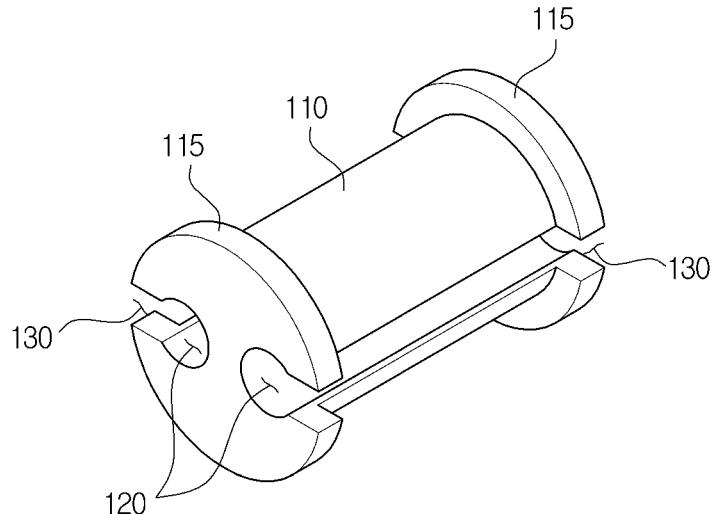
FIG. 2 a perspective view of a main body according to an embodiment of the present disclosure.
Figure 3:
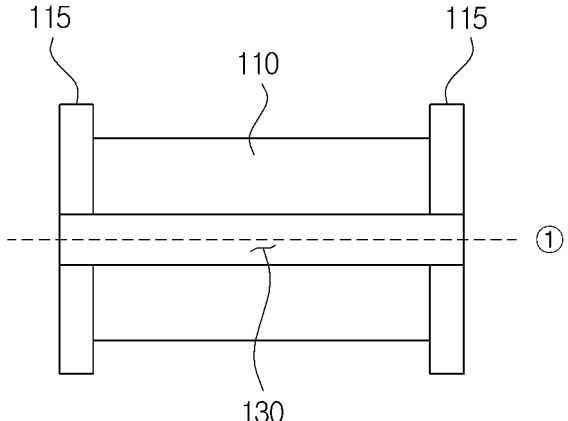
FIG. 3 is a side view of a main body according to an embodiment of the present disclosure.
Figure 4:
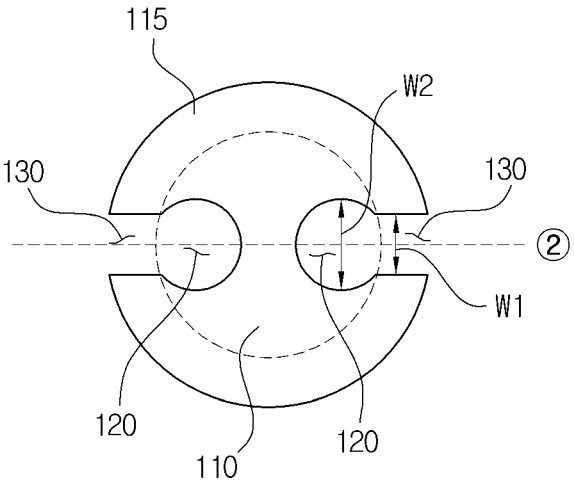
FIG. 4 is a front or rear view of a main body according to an embodiment of the present disclosure.

FIG. 1 is a perspective view of a grommet 100 for a wire according to an embodiment of the present disclosure. In addition, FIGS. 2 to 4 are perspective views and side views of a main body 110 according to an embodiment of the present disclosure.

Referring to FIGS. 1 to 4, the grommet 100 for a wire according to the embodiment of the present disclosure includes the main body 110 extending in parallel to a longitudinal direction of a wire 10, passing holes 120 formed to pass through the main body 110 in the longitudinal direction in which wires 10 are inserted, arranged or seated, an insertion slit 130 open or formed to pass through the side of the main body 110 so that the wire 10 can enters, or be inserted into, the passing hole 120 from the side of the main body 110, and a support body 140 configured to fix the main body 110 to a supportable structure including a vehicle body or panel.

The main body 110 may be provided in a tubular shape extending in a first direction ① parallel to the longitudinal direction of the wire 10. In the embodiment shown in FIGS. 1 to 4, the main body 110 is formed in a cylindrical shape, but is not limited thereto. The main body 110 may have any shape which can support one or more wires 10 and/or be coupled to the support body 140. For example, the cross-sectional shape of the main body 110 may be formed in a polygonal cylinder shape such as a triangular, square, or hexagonal shape.

The main body 110 may be formed as a main body supporting the wires 10, and may be made of a material such as elastically deformable or flexible rubber or the like so that the wire 10 can easily enter, or be inserted into, and be seated in the passing hole 120 through the insertion slit 130 to be described below. In addition, the outer circumferential sur- face of the main body 110 may serve as a compression surface that is compressible by coming into contact with a clamp part 141 of the support body 140 to be described below, and a support protrusion or flange 115 may be provided at each of both ends of the main body 110 to prevent separation from the clamp part 141 of the support body 140 to be described below. A detailed description of these features and configurations will be described below.

The passing holes 120 may be formed to pass through the main body 110 in the first direction ① parallel to the longitudinal direction of the main body 110. That is, the passing holes 120 may be formed to pass through both ends of the main body 110, and the wires 10 may be inserted into and passed through the inside of the passing holes 120 so that the wire 10 may be seated or inserted and supported in the main body 110. The cross-sectional shape of the passing hole 120 may be provided in a circular shape, a shape formed to correspond to the cross-sectional shape of the wire 10 or any shape capable of supporting the wire 10 therein, and the diameter w2 of the passing hole 120 may be provided to correspond to the diameter or thickness of the wire 10. The passing holes 120 may be provided as a pair at facing positions symmetrically so as to support the pair of wires 10 in the main body 110 to support the pair of wires 10 in the main body 110.

The insertion slit 130 may be formed to be open or pass through a side of the main body 110 so that the wire 10 can enter, or be inserted into, the inside of the passing hole 120 from the side of the main body 110. Specifically, the insertion slit 130 may be formed to pass through the side surface of the main body 110 in a second direction ② or radial direction so that the outer side communicates with the outside and the inner side communicates with the passing hole 120 so that the wire 10 may enter, or be inserted into, the passing hole 120 in the second direction ② orthogonal to the first direction ①.

A gap or width W1 of the insertion slit 130 may be provided smaller than the diameter or thickness of the wire 10 and the gap or width W1 of the insertion slit 130 may be smaller than the diameter W2 of the passing hole 120. As described above, as the main body 110 is made of an elastically deformable or flexible material, when the wire 10 enters, or be inserted into, the insertion slit 130, the gap W1 of the insertion slit 130 can expand and the wire 10 can pass through the insertion slit 130 so that it can be seated or disposed in the passing hole 120. When the wire 10 is seated or inserted in the passing hole 120, the main body 110 is elastically restored and the gap W1 of the insertion slit 130 can be reduced by resuming its normal shape after being deformed, thereby preventing the wire 10 from escaping, or falling off from, the passing hole 120. A pair of insertion slits 130 may be provided in the main body 110 to correspond to the arrangement position and number of passing holes 120. As described above, when a pair of passing holes 120 are provided in the main body 110 to face each other, a pair of insertion slits 130 may be provided to connect each of the passing holes 120 to the outside of the main body 110 or to be open to the outside of the main body 110. As such, in the main body 110 according to an embodiment of the present disclosure, since the wire 10 may be inserted and seated in the passing hole 120 from the outside of the main body 110 through the insertion slit 130 provided in the side of the main body 110, the time and labor consumed in wiring work can be reduced.

The support body 140 may be provided or configured to stably fix or bind the wire 10 to the main body 110 as well as fix the main body 110 in which the wire 10 is supported or mounted at a specific point on a vehicle body or panel. To this end, the support body 140 may include the clamp part 141 coupled to the main body 110 and/or configured to compress at least a portion of the main body 110 and a fixing part 149 fixed to a supportable fixture such as a vehicle body or panel.

The clamp part 141 may be provided at one side or end portion of the support body 140 and may be coupled or combined with the main body 110 to compress at least a part of the main body 110 in a state that the main body 110 is inserted into the claim part 141. The clamp part 141 may be provided so that at least a part of the main body 110 is drawn inward or in contact with at least a part of the outer circumferential surface of the main body 110, and may be made of a material such as elastically deformable or flexible rubber to compress the main body 110. As described above, as the main body 110 may be made of an elastically deformable material, the clamp part 141 may compress the main body 110 to reduce the diameter W2 of the passing hole 120 or the gap or width W1 of insertion slit 130 may be reduced.

The shape of an inner surface of the clamp part 141 may be provided to correspond to the shape of an outer surface of the main body 110. For example, when the main body 110 is formed in a cylindrical shape, the clamp part 141 may have a curved shape so that the shape of the inner circum- ferential surface of the clamp part 141 corresponds to the shape of the outer circumferential surface of the main body 110. The clamp part 141 may form, for example, but not limited to, a hollow shape. In an embodiment of the present disclosure, the inner circumferential diameter of the clamp part 141 may be smaller than the outer circumferential diameter of the main body 110 so that the clamp part 141 can effectively compress at least a part of the outer surface of the main body 110. For example, the stiffness of the clamp part 141 may be greater than the stiffness of the main body 110.

In contrast, when the main body 110 may be provided in a polygonal cylinder shape, the inner cross-section of the clamp part 141 may have a polygonal or curved shape to compress the main body 110, and the clamp part 141 may compress at least a part of the outer surface of the main body 110. In order to effectively compress the main body 110, the inner cross-sectional area of the clamp part 141 may be smaller than the cross-sectional area of the main body 110.

A mounting hole or slit 142 may be provided to pass through or be open in an end portion of the clamp part 141 in the first direction ① to allow the main body 110 to enter inward or insert the main body 110 into the clamp part 141 through the mounting hole or slit 142. The mounting hole or slit 142 may be formed by a gap between the support body 140 and the end portion of the clamp part 141, and the size of the gap or width of the mounting hole or slit 142 may be smaller than the diameter or thickness of the main body 110. In addition, the support body 140 or the clamp part 141 may be made of an elastic, deformable or flexible material such as elastically deformable rubber. Therefore, when the main body 110 enters, or is inserted into, the inside of the clamp part 141, the gap of the mounting hole or slit 142 is enlarged or expanded so that the main body 110 can pass through the mounting hole or slit 142 and be seated or disposed inside the clamp part 141. Then, as the support body 140 or the clamp part 141 is elastically restored, the gap or distance of the mounting hole or slit 142 (e.g. the distance between the support body 140 and the end portion of the claim part 141) is reduced or returned to a normal or original state, and thereby, the support body 140 or the clamp part 141 can prevent the main body 110 from being separated or falling off from the clamp part 141 in the second direction ② or in the radial direction of the main body 110.

Also, an opening 145 configured to allow an operator or manufacturer to visually check the completion of the wiring assembly work and the reduction of the gap W1 of the insertion slit 130 and reducing the weight of the support body 140 may be formed at the clamp part 141.

Meanwhile, the deviation of the main body 110 entering or inserted into the inside of the clamp part 141 in the first direction ① or longitudinal direction can be prevented by the support protrusions 115 provided at both ends of the main body 110. The support protrusion 115 may be formed in a flange shape by protruding outward in the radial direction from one end and the other end of the main body 110. As a result, the separation of the main body 110 passing through the mounting hole 142 and seated or disposed inside the clamp part 141 may be prevented by the compression force of the clamp part 141 and the deviation of the main body 110 in the first direction ① or longitudinal direction may be prevented by the support protrusions 115 protruding from both ends of the main body 110, so that the wire 10 can be stably supported and fixed. The support protrusion 115 may be integrally injection molded with the main body 110 to simplify the manufacturing process.

The fixing part 149 may be provided at the other side or end portion of the support body 140 and fixed to a support- able structure such as a vehicle body or panel, thereby fixing the main body 110 in which the wire 10 is mounted at a specific point on the vehicle body or panel. For instance, the fixing part 149 and the vehicle body may be bound or fixedly coupled to each other by a fastening member such as a bolt or rivet. To this end, the coupling hole 148 through which the fastening member passes may be formed in or at the fixing part 149. The shape of the fixing part 149 may be variously changed according to the shape or location of the vehicle body or panel.

Hereinafter, wiring assembly work through the grommet 100 for a wire according to an embodiment of the present disclosure will be described.

Figure 5:
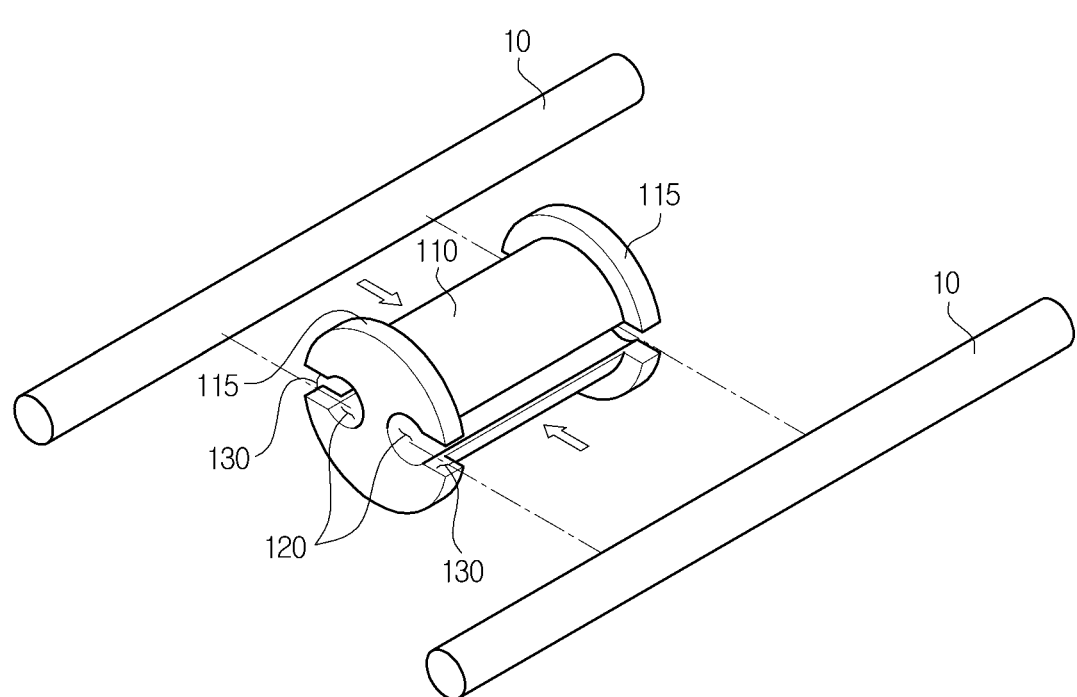
FIG. 5 is a perspective view for showing a process of inserting a wire into an insertion slit of a main body according to an embodiment of the present disclosure.
Figure 6:
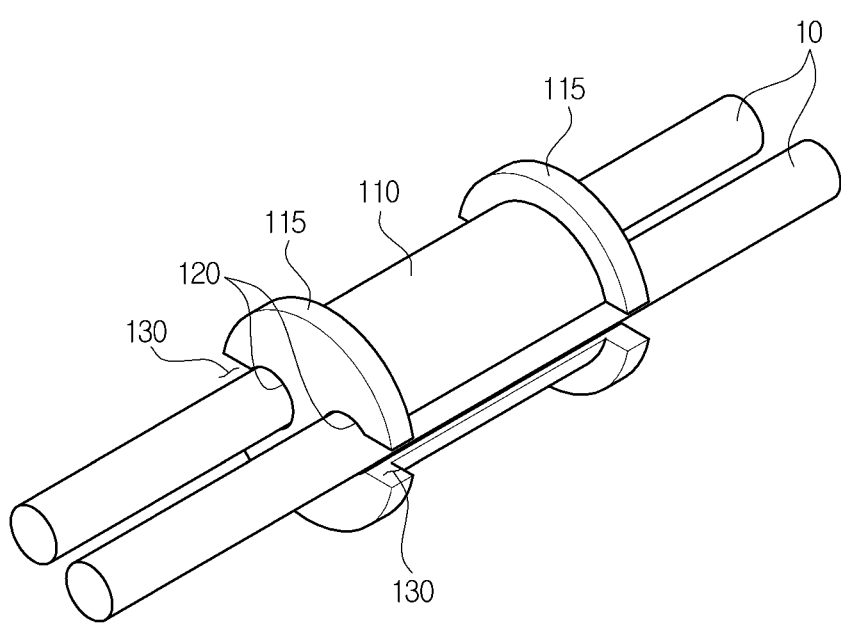
FIG. 6 is perspective view for showing a state in which a wire is inserted in a passing hole of a main body according to an embodiment of the present disclosure.

In the case of supporting the wire 10 in the main body 110, the side of the wire 10 approaches and is inserted into the insertion slit 130 while facing the side of the main body 110 (see FIG. 5). The gap W1 of the insertion slit 130 may be smaller than the diameter or thickness of the wire 10, but since the main body 110 is made of an elastically deformable or flexible material, the gap or width W1 of the insertion slit 130 can be enlarged or expanded and the wire 10 can be disposed or seated in the passing hole 120 when the wire 10 passes through the insertion slit 130. After the wire 10 is inserted or seated in the passing hole 120, the main body 110 is elastically restored to an original or normal state and the gap or width W1 of the insertion slit 130 is reduced, thereby preventing the wire 10 from escaping or falling out from the passing hole 120 to the outside of the main body 110 (see FIG. 6).

Figure 7:
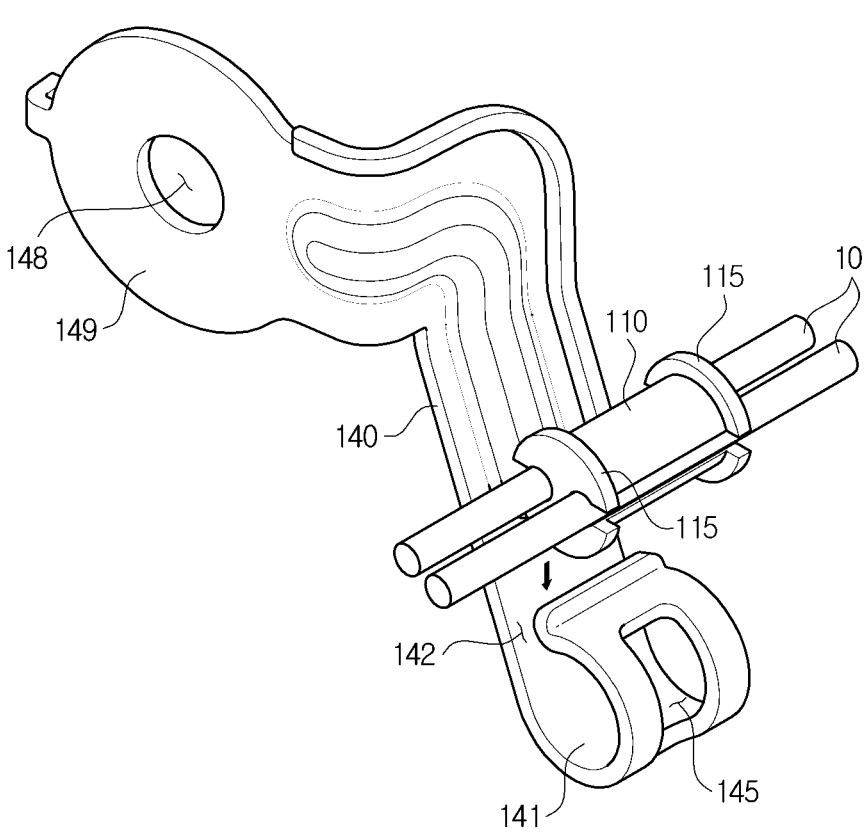
FIG. 7 is a perspective view for showing a process of inserting a main body into a mounting hole or slit of a clamp part of a support body according to an embodiment of the present disclosure.

After one or a plurality of wires 10 are inserted or seated in the passing holes 120 of the main body 110, the main body 110 and the wires 10 are combined or coupled with the support body 140 to fix them to a specific point on a vehicle body or panel. In order to assembly or seat the main body 110, in which the wire 10 is seated in the passing hole 120, inside the clamp part 141 of the support body 140, the main body 110 is brought closer to and inserted into the mounting hole or slit 142 (see FIG. 7).

Figure 8:
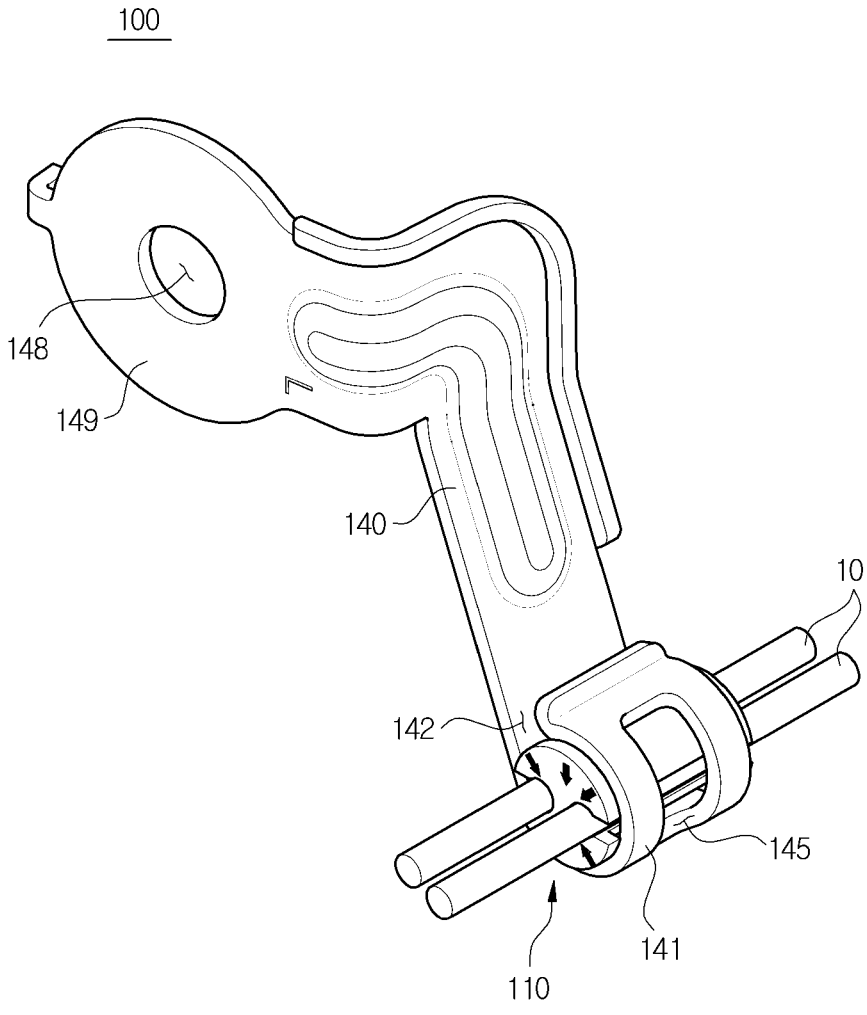
FIG. 8 is a perspective view for showing a state in which a main body in which a wire is inserted is inserted and compressed in a fastening portion of a clamp part of a support body according to an embodiment of the present disclosure.

The gap or width of the mounting hole or slit 142, such as the distance between the support body 140 and the end portion of the claim part 141, is smaller than the diameter or thickness of the main body 110, but since the support body 140 or the clamp part 141 is made of an elastically deformable or flexible material, the main body 110 may be inserted and seated inside the clamp part 141 when the main body 110 passes through the mounting hole or slit 142 as the gap of the mounting hole 142 is enlarged or expanded. Since the inner circumferential diameter or inner cross-sectional area of the clamp part 141 is smaller than the outer circumferential diameter or cross-sectional area of the main body 110, the main body 110 inserted in the inner side of the clamp part 141 is compressed by the clamp part 141 so that the diameter W2 of the passing hole 120 or the gap W1 of the insertion slit 130 is reduced to an original or normal state. As a result, it is possible to prevent the wire 10 from being separated from or falling out from the main body 110. Meanwhile, after the main body 110 passes through the mounting hole or slit 142 and is disposed or seated inside the clamp part 141, the support body 140 or the clamp part 141 is elastically restored and the gap or width of the mounting hole or slit 142, such as the distance between the support body 140 and the end portion of the claim part 141, can be reduced. As a result, the separation of the main body 110 from the clamp part 141 can be prevented and suppressed. In addition, since the separation of the clamp part 141 and the main body 110 in the first direction ① or the longitudinal direction can be suppressed and prevented by the support protrusions 115 provided at both ends of the main body 110, the wire 10 mounted in the main body 110 can be stably fastened or fixed to the support body 140 (see FIG. 8).

Figure 9:
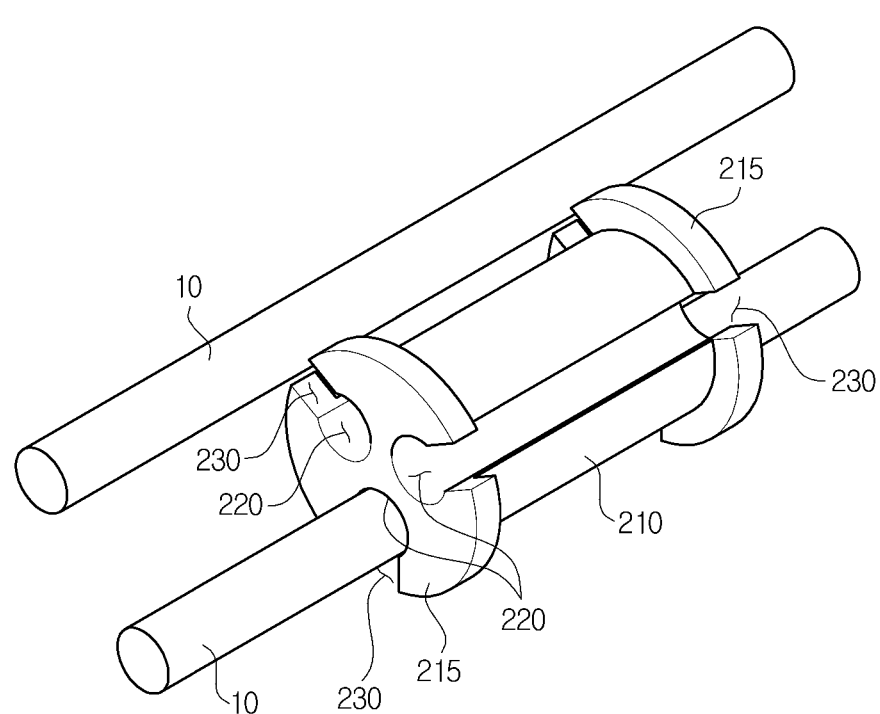
FIG. 9 is a perspective view for showing a process of inserting a wire into an insertion slit of a main body according to an embodiment of the present disclosure.

FIG. 9 is a perspective view for showing a process of inserting a wire 10 into an insertion slit 230 of a main body 210 according to an embodiment of the present disclosure. Referring to FIG. 9, a grommet for a wire according to an embodiment of the present disclosure includes the main body 210 that extends parallel to the longitudinal direction of the wire 10, a plurality of passing holes 220 which are formed to pass through the main body 210 in the longitudinal direction and in which the wire 10 is inserted or seated, a plurality of insertion slits 230 formed to be open in or pass through the side of the main body 210 so that each of the wires 10 can enter or be inserted into a respective one of the passing holes 220 from the side of the main body 210, and the support body 140 configured to fix the main body 210 to a supportable structure such as a vehicle body or panel.

The main body 210 may be provided in, for example, but not limited to, a tubular or polygonal tubular shape extending in a first direction ① parallel to the longitudinal direction of the wire 10. The main body 210 may be formed as a main body supporting the wire 10, and may be made of an elastic, deformable or flexible material such as elastically deformable rubber or the like so that the wire 10 can easily enter or be inserted into and be disposed or seated in the passing hole 220 through the insertion slit 230. In addition, the outer circumferential surface of the main body 210 may serve as a compression surface that is compressed by coming into contact with the clamp part 141 of the support body 140, and support protrusions 215 may be provided at both ends of the main body 210 to prevent separation from the clamp part 141 of the support body 140.

The passing holes 220 may be formed in the main body 210 in the first direction ① parallel to the longitudinal direction of the main body 210. That is, the passing holes 220 may be formed to pass through both ends of the main body 210, and the wire 10 may be inserted into and passed through the passing hole 220 so that the wire 10 may be disposed or seated and supported in the main body 110. The cross-sectional shape of the passing holes 220 may be provided in a circular shape or formed to correspond to the cross-sectional shape of the wire 10, and the diameter W2 of the passing hole 220 may be provided to correspond to the diameter or thickness of the wire 10. In addition, three sets of passing holes 220 may be provided at regular intervals from each other to support a plurality of wires 10 in the main body 210. For example, as shown in FIG. 9, three passing holes 220 may be arranged with a phase difference of 120° from each other based on the central axis of the main body 210, but is not limited thereto, and the passing holes 220 may be formed through an optimal position in the main body 210 where no external force is applied to the wire 10. Furthermore, although FIG. 9 shows that three passing holes 220 are provided in the main body 210, when the number of wires 10 to be wired is one or more than three, passing holes 220 may be formed to pass through the main body 210 and support the wires 10 in a number corresponding to the number of wires 10.

The insertion slit 230 may be formed to be open in or pass through a side surface of the main body 210 so that the wire 10 can be inserted into or enter the inside of the passing hole 220 through the insertion slit 230 from the side of the main body 210. The insertion slit 230 may be formed to pass through the side surface of the main body 210 in a second direction ② or radial direction so that the outer side communicates with the outside and the inner side communicates with the passing hole 220 so that the wire 10 may be inserted into or enter the passing hole 220 in the second direction ② orthogonal to the first direction ①.

The gap or width W1 of the insertion slit 230 may be smaller than the diameter or thickness of the wire 10 and the gap or width W1 of the insertion slit 230 may be smaller than the diameter W2 of the passing hole 220. As described above, as the main body 210 may be made of an elastically deformable or flexible material, when the wire 10 is being inserted into or entering the insertion slit 230, the gap W1 of the insertion slit 230 expands and the wire 10 can pass through the insertion slit 230 so that it can be disposed or seated in the passing hole 220. When the wire 10 is disposed or seated in the passing hole 220, the main body 210 is elastically restored and the gap or width W1 of the insertion slit 230 can be reduced to a normal or original state, thereby preventing the wire 10 from falling out from or escaping the passing hole 220. A plurality of insertion slits 230 may be provided in the main body 210 corresponding to the number of passing holes 220. For example, as shown in FIG. 9, when three passing holes 220 are provided in the main body 210, three insertion slits 230 may be provided to connect each the passing hole 220 to the outside of the main body 210. In addition, when the number of wires 10 requiring wiring is one or more than three, insertion slits 230 corresponding to the number of wires 10 are provided to allow the wire 10 to enter each passing hole 220.

In the grommet for the wire 10 according to an embodiment of the present disclosure, rather than a way of inserting and supporting the wire 10 in the grommet in the longitudinal direction of the wire 10 during wiring assembly work, the wire 10 may be inserted and seated in the passing holes 120 and 220 from the outside of the main body 110 and 210 through the insertion slits 130 and 230, so the time spent on the wiring assembly work may be reduced and work efficiency can be improved. In addition, since the clamp part 141 of the support body 140 compresses and supports the main body 110 or 210 in which the wire 10 is disposed or seated, thereby reducing the diameter W2 of the passing hole 120 or 220 or the gap W1 of the insertion slit 130 or 230, it is possible to prevent the wire 10 from being separated or falling out from the main body 110 or 210 and to accomplish promote the stably fixation and support of the wire 10. Furthermore, since the plurality of wires 10 can be simultaneously supported in the single main body 110 or 210, the space utilization of a vehicle body can be improved with a simple structure, and the manufacturing costs of parts can be reduced.

A grommet for a wire according to an embodiment of the present disclosure can stably fix one or a plurality of wires on a vehicle body or panel.

A grommet for a wire according to an embodiment of the present disclosure can promote easy and quick mounting of one or a plurality of wires.

A grommet for a wire according to an embodiment of the present disclosure has a simple structure and can improve assembly work efficiency.

A grommet for a wire according to an embodiment of the present disclosure can reduce manufacturing costs and improve the space utilization of a vehicle body.

What is claimed is:

1. A grommet for a wire, comprising:
a main body extending in a first direction;
a passing hole formed in the main body and passing through the main body, wherein the wire is disposed in the passing hole of the main body;
an insertion slit which is connected to the passing hole and is formed to open at a side surface of the main body to be exposed to an outside of the main body so that the wire is insertable into the passing hole of the main body in a second direction different from the first direction through the insertion slit formed at the side surface of the main body; and

a support body including a clamp part provided on one side thereof to accommodate at least a part of the main body, and a fixing part provided on the other side thereof to be fixed to a supportable structure of a vehicle body or panel,
wherein an end of the clamp part, which faces the fixing part with a mounting hole or slit interposed therebetween, is formed in a curved shape toward a direction opposite to the fixing part.

2. The grommet of claim 1, wherein a gap of the insertion slit is smaller than a diameter or thickness of the wire.

3. The grommet of claim 1, wherein:
the main body has a cylindrical shape; and
a shape of an inner circumferential surface of the clamp part of the support body corresponds to a shape of an outer circumferential surface of the main body.

4. The grommet of claim 1, wherein:
the main body has a cylindrical shape; and
the clamp part of the support body is formed to be curved to be in contact with at least a part of the outer circumferential surface of the main body.

5. The grommet of claim 1, wherein the main body is insertable into the clamp part through the mounting hole or slit.

6. The grommet of claim 1, further comprising support protrusions provided at both end portions of the main body and protruding outward in a radial direction of the main body.

7. The grommet of claim 5, wherein the main body and/or the clamp part of the support body have an elastically deformable or flexible material.

8. The grommet of claim 7, wherein a gap of the mounting hole or slit of the clamp part of the support body is smaller than a diameter or thickness of the main body.

9. The grommet of claim 7, wherein an inner cross-sectional area of the clamp part of the support body is smaller than a cross-sectional area of the main body.

10. The grommet of claim 1, wherein the passing hole and the insertion slit are provided as a plurality of passing holes and a plurality of insertion slits, respectively, in the main body.

11. The grommet of claim 2, wherein an inner diameter of the passing hole of the main body is correspond to the diameter or thickness of the wire.

12. A grommet for a wire, comprising:
a main body having a cylindrical or polygonal shape;
a passing hole formed in the main body and passing through the main body so that the wire is inserted in the passing hole and passes through the main body;
an insertion slit passing through between an outer circumferential surface of the main body and the passing hole in a radial direction of the main body, wherein the insertion slit is smaller than a diameter of the passing hole; and
a support body including a clamp part provided on one side thereof to accommodate at least a part of the main body, and a fixing part provided on the other side thereof to be fixed to a supportable structure of a vehicle body or panel,
wherein an end of the clamp part, which faces the fixing part with a mounting hole or slit interposed therebetween, is formed in a curved shape toward a direction opposite to the fixing part.

13. The grommet of claim 12, wherein:
the main body and/or the support body have an elastically deformable or flexible material; and the clamp part is configured to compress at least a portion of the main body.

14. The grommet of claim 13, wherein the insertion slit of the main body is smaller than a diameter or thickness of the wire.

15. The grommet of claim 13, wherein the passing hole and the insertion slit are provided in a plurality of passing holes and a plurality of insertion slits, respectively, in the main body.

16. The grommet of claim 13, wherein the main body is insertable in the clamp part of the support body through the mounting hole or slit.

17. The grommet of claim 13, further comprising support protrusions formed on both end portions of the main body to protrude outward in the radial direction of the main body.

18. The grommet of claim 16, wherein the inner surface of the clamp part of the support body has a cylindrical or polygonal shape to correspond to a shape of the outer circumferential surface of the main body.

\* \* \* \* \*